United States Patent
Gentner et al.

(10) Patent No.: US 8,301,031 B2
(45) Date of Patent: Oct. 30, 2012

(54) METHOD AND ARRANGEMENT FOR SWITCHING A RAMAN PUMP LASER ON AND/OR OFF

(75) Inventors: Guido Gentner, München (DE); Gerhard Thanhäuser, Mering (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 969 days.

(21) Appl. No.: 12/304,673

(22) PCT Filed: Jun. 12, 2007

(86) PCT No.: PCT/EP2007/055768
§ 371 (c)(1),
(2), (4) Date: Jan. 6, 2009

(87) PCT Pub. No.: WO2007/144348
PCT Pub. Date: Dec. 21, 2007

(65) Prior Publication Data
US 2009/0190928 A1    Jul. 30, 2009

(30) Foreign Application Priority Data

Jun. 13, 2006 (DE) .................. 10 2006 027 415

(51) Int. Cl.
*H04B 10/00* (2006.01)

(52) U.S. Cl. ........................................ 398/157
(58) Field of Classification Search .................. 398/157
See application file for complete search history.

(56) References Cited

U.S. PATENT DOCUMENTS

| | | |
|---|---|---|
| 5,425,060 A | 6/1995 | Roberts |
| 7,920,787 B2 * | 4/2011 | Gentner et al. ............... 398/16 |
| 2004/0033004 A1 * | 2/2004 | Welch et al. .................. 385/14 |

FOREIGN PATENT DOCUMENTS

| | | |
|---|---|---|
| DE | 102 16 279 A1 | 10/2003 |
| WO | WO-03/088528 A1 | 10/2003 |

OTHER PUBLICATIONS

Floyd M. Gardner; Clock and carrier synchronisation: prefilter and antihang-up investigations; ESA Contract No. 2582/75; pp. 5-42.

Afshin Haghighat; Low-Jitter Symbol Timing Recovery for M-ary QAM and PAM Signals; A Thesis in The Department of Electrical Engineering; Montreal Quebec, Canada; Aug. 1998.

* cited by examiner

*Primary Examiner* — Patrick Stafford
(74) *Attorney, Agent, or Firm* — Laurence A. Greenberg; Werner H. Stemer; Ralph E. Locher

(57) ABSTRACT

Optoelectrical conversion of the received optical service signal (OSS), bandpass filtering and subsequent squaring produce a spectral line at the clock frequency ($f_T$). This clock line (TL) is selected by means of narrowband filtering and rectified. The service signal voltage ($V_{TLM}$) obtained in this manner is used to switch on a Raman pump laser (11).

12 Claims, 5 Drawing Sheets

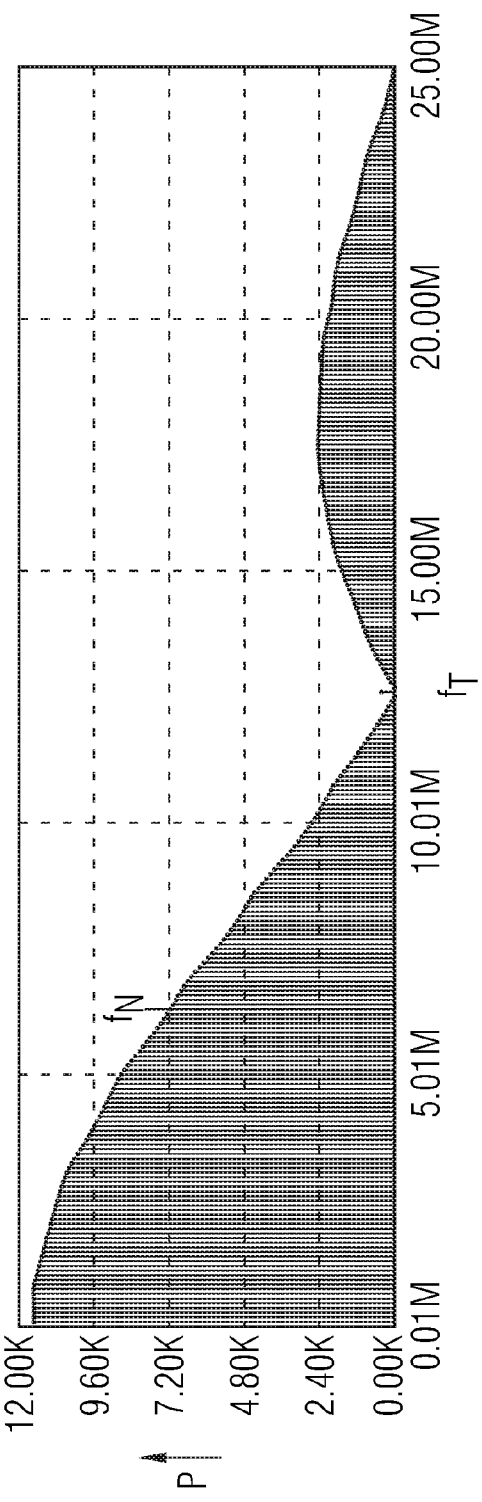
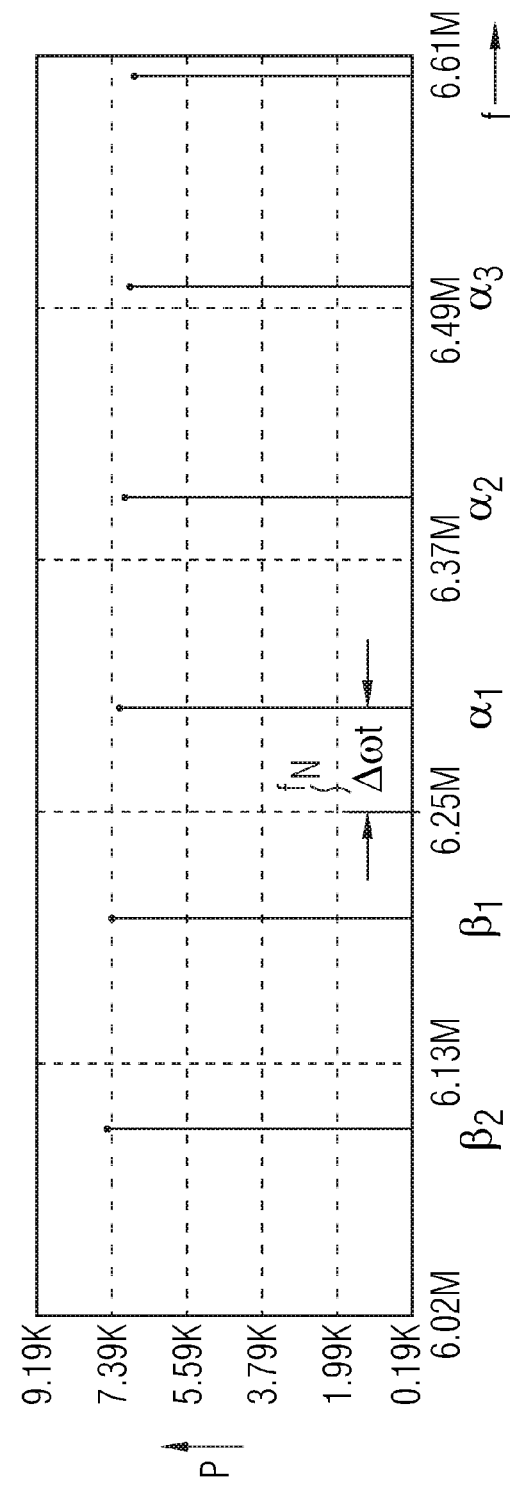
FIG 3
FIG 4

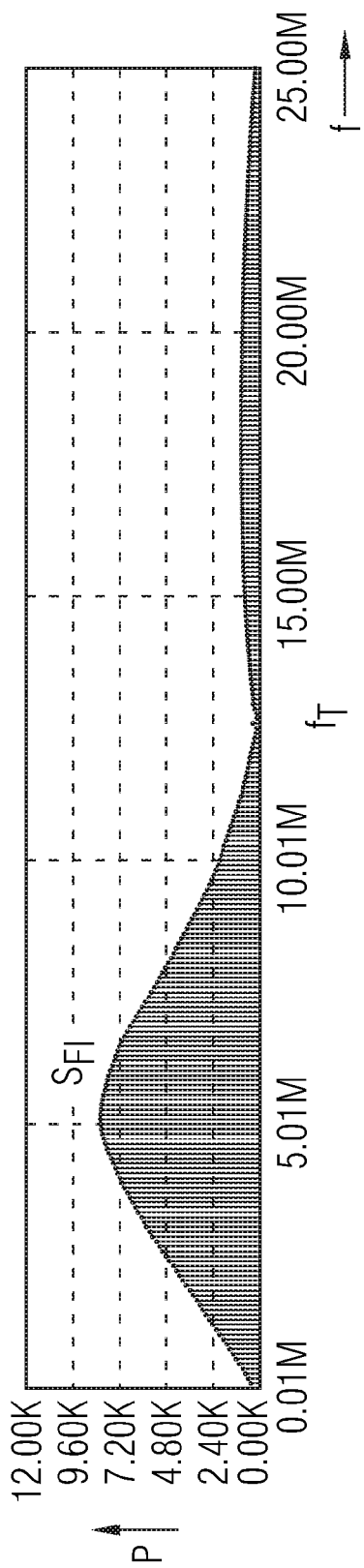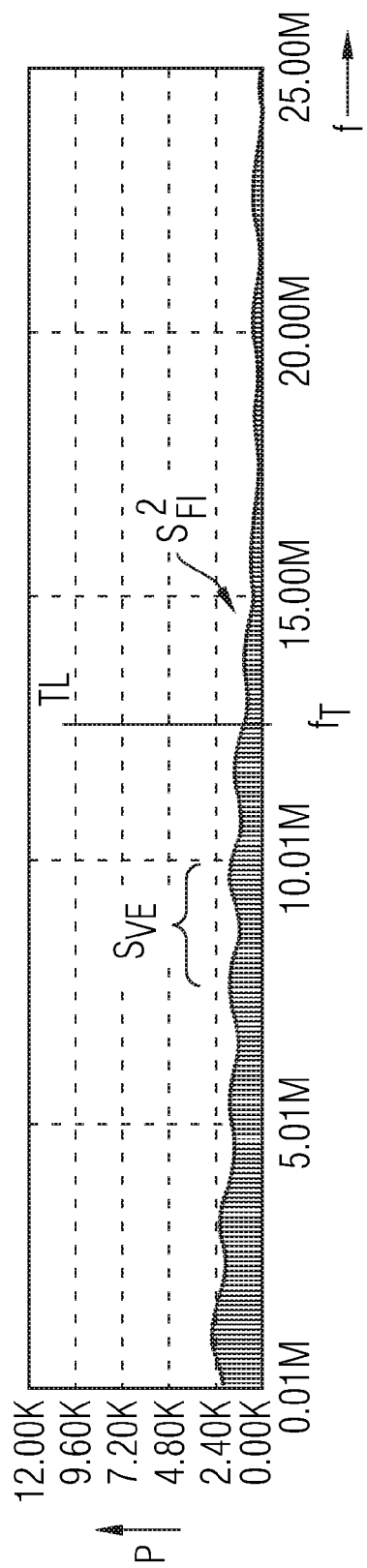

METHOD AND ARRANGEMENT FOR SWITCHING A RAMAN PUMP LASER ON AND/OR OFF

CLAIM FOR PRIORITY

This application is a national stage application of PCT/EP2007/055768, filed Jun. 12, 2007, which claims the benefit of priority to German Application No. 10 2006 027 415.6, filed Jun. 13, 2006, the contents of which hereby incorporated by reference.

TECHNICAL FIELD OF THE INVENTION

The invention relates to a method and arrangement for switching a Raman pump laser on and/or off, as well as to the use in switching off a laser.

BACKGROUND OF THE INVENTION

Both fiber amplifiers and Raman amplifiers, in which the optical transmission fiber is pumped with a high optical power in the opposite direction to the transmission signal, are used in modern optical networks. The resultant quantum-mechanical effect amplifies the transmitted signal whose wavelength is above the pump wavelength. This concept allows the signal-to-noise ratio to be considerably improved and allows the amplifier-free/regenerator-free transmission length to be increased.

As a result of the use of Raman amplifiers, the Raman pump laser must be switched off in an even more reliable manner than the transmission lasers in the event of the fiber being interrupted in order to avoid endangering people by the pump light emerging from the interrupted fiber.

For signaling purposes, a service signal is transmitted in addition to a wavelength-division multiplex signal. Said service signal may be modulated onto the complete WDM signal, for example. Nowadays, the service signal is usually transmitted in a separate service channel whose wavelength usually has a relatively large wavelength separation from the data channels. In this case, the service signal is fed in with a relatively low level so that it can always be transmitted, that is to say even in the case of an interrupted line, without endangering people. Reception of the service signal is detected, is rated as proof of an intact connection and is used to switch on the Raman pump laser and the transmission lasers, whereupon data transmission is then started or continued.

In the case of transmission paths of the maximum length and when the Raman pump laser is switched off, in particular, detection of the service signal is problematic if its level is below the noise level and it is impossible to regenerate the data in the service channel.

The patent application WO 03/088528 A1 describes, as the closest prior art, a method for detecting a control signal. A small proportion of power is branched off from the received signal using a coupler, is optoelectrically converted and amplified, and a spectral line of the control signal is then selected. The power of the isolated spectral line is assessed and is used to switch the Raman pump laser on and/or off. In this case, the service channel is coded in such a manner that a relatively large proportion of the transmission signal power is concentrated on a spectral line which corresponds to the clock frequency. CMI coding or transmission of RZ pulses is used, for example, for this purpose.

However, this solution becomes more inefficient as the data rate of the service channel increases since a considerable proportion of the power of the service signal is used for the signal power at the "clock line" rather than for transmitting information. A "penalty" of approximately 2.5 dB can be expected with this type of coding, which penalty can be compensated for by a correspondingly higher power of the laser at the transmitting end with a correspondingly higher price, but the maximum permissible power of the service signal must not be exceeded.

The work entitled "Low-Jitter Symbol Timing Recovery for M-ary QAM and PAM signals" by Afshin Haghighat in order to attain the "Degree of Master of Applied Science" from Concordia University Montreal, Quebec, Canada, August 1998, 0-612-39476-X, pages 17, 18 and 45, describes the recovery of the clock signal by means of high-pass pre-filtering, squaring and narrowband bandpass filtering. The aim is to recover the clock signal, for which the higher frequency components of the spectrum are required, but, owing to the high-pass filter, the noise above the Nyquist frequency is not limited.

SUMMARY OF THE INVENTION

The object of the invention is to specify a method for switching a Raman pump laser on and/or off with more effective transmission codes, and also to specify an arrangement which is suitable for this purpose.

It is advantageous to transmit an NRZ (Non Return to Zero) coded service signal which has more effective use of the signal power. Such an NRZ signal has a zero at the clock line. The spectral power density of an NRZ signal has particular symmetry properties with respect to half the clock frequency, the Nyquist frequency. When transmitting pseudo random sequences, a line spectrum which forms the basis of the considerations below is produced with corresponding symmetry properties. If, following optoelectrical conversion, the spectrum is filtered in a suitable manner using a bandpass filter or a filter having bandpass properties, the noise is limited and the filtered spectrum is then squared, after which the energy of numerous spectral lines is concentrated on the clock spectral line (called clock line for short) and is summed there. The clock line is subjected to narrowband evaluation, as a result of which it is possible to detect the service signal even in the case of a very low level and a poor signal-to-noise ratio (for example −9 dB at a noise level of 0 dB).

If a controllable amplifier is connected upstream of the bandpass filter, this has the advantage, on the one hand, that only a small proportion of the signal power needs to be extracted and, on the other hand, that, as a result of the amplification, further processing is facilitated by a greater signal level, whereas the output signal is limited in the case of a greater signal level, in short the operating range is increased. The output level is kept approximately constant in order to be able to use as constant a threshold as possible to detect the service signal.

After squaring, the clock spectral line generated is advantageously selected using a narrowband receiver, for example a heterodyne receiver.

Reliable evaluation is achieved by comparing the amplitude of the clock spectral line with part of the remaining spectrum. A corresponding comparison signal which, when the service signal is present, comprises parts of the useful signal and noise can be obtained before squaring or after squaring.

BRIEF DESCRIPTION OF THE DRAWINGS

One exemplary embodiment of the invention is explained in more detail using figures, in which:

FIG. 3 shows a frequency spectrum of the demodulated service signal.

FIG. 4 shows a section of the frequency spectrum.

FIG. 5 shows frequency spectra at the output of a prefilter and at the output of the squaring element.

DETAILED DESCRIPTION OF THE INVENTION

Figure 1:
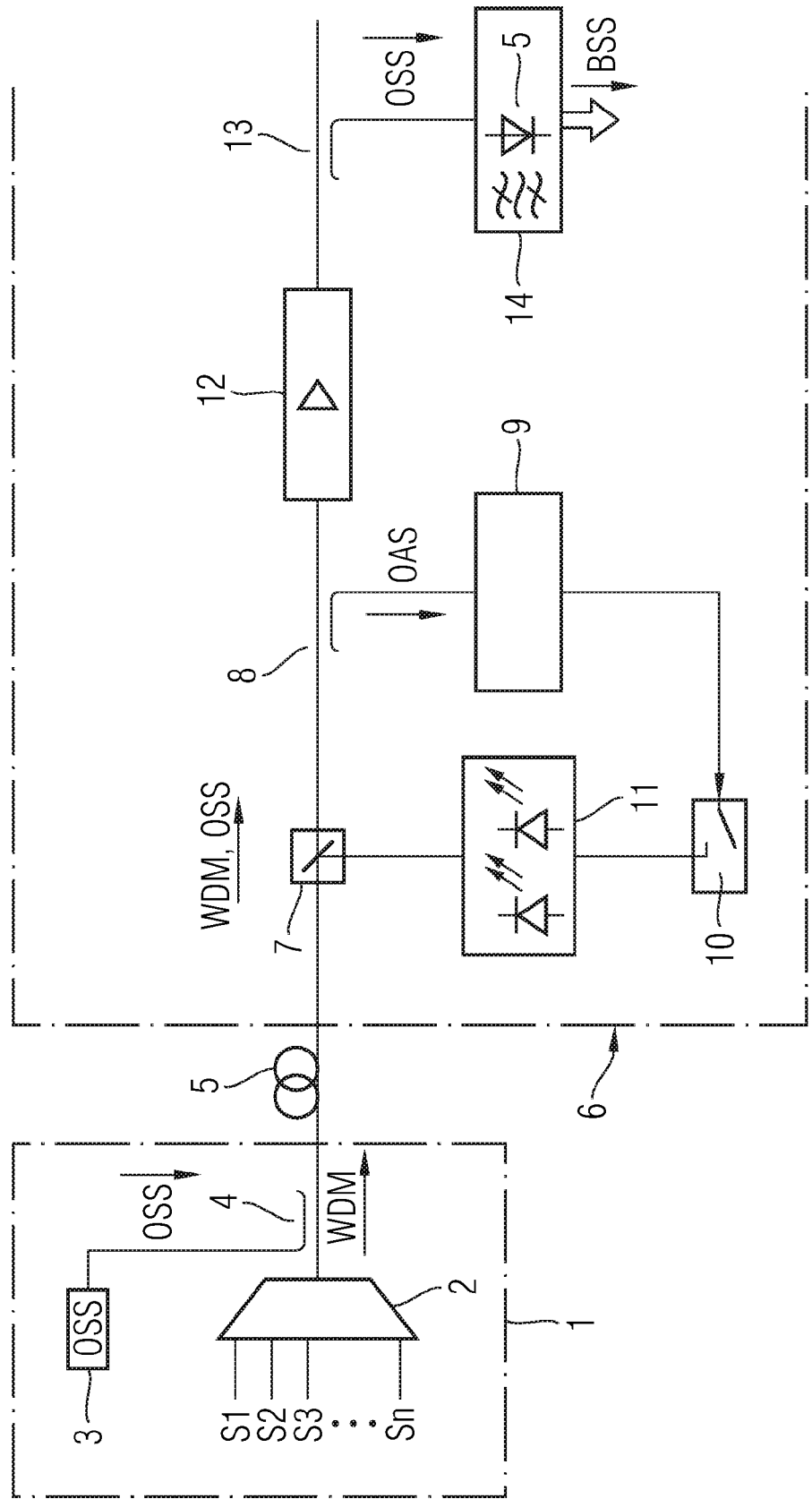
FIG. 1 shows a transmission path having an arrangement for detecting a service signal with a Raman pump laser switching-off device.

FIG. 1 shows a transmission section. A multiplexer 2 is used to combine a plurality of data signals S1-Sn to form a wavelength-division multiplex signal WDM in a transmitting device 1. In addition, the transmitting device also contains an NRZ service signal generator 3 which, in this case, generates a service signal OSS having a wavelength which differs from the wavelengths of the useful signals. This service signal is combined, in terms of frequency, with the wavelength-division multiplex signal WDM using a first coupling device 4 (or further WDM multiplexer). One of the signals S to Sn may likewise be used as the service signal or the first coupling device 4 may be replaced with a wavelength-division multiplexer. In one variant, the coupler 4 may be replaced with a modulator in order to modulate the service signal onto the WDM signal.

The transmitting device 1 is connected to a receiving device (or regenerator) 6 by means of an optical waveguide 5. During operation, the WDM signal WDM and the optical service signal OSS are transmitted. In order to be able to transmit the signals over as long a path as possible without further repeaters, a Raman pump laser 11, which feeds its pump signal RPS into the optical waveguide 5 counter to the transmission direction of the data signals using a second coupler 7, is arranged at the receiving end. The Raman amplification in the fiber makes it possible to receive both the data signals and the service signal with an adequate signal-to-noise ratio at the receiving end.

A fiber amplifier 12 which amplifies the received data signals is provided at the receiving end. Said signals are then transmitted over a further path section or, if a receiving terminal device is involved, are supplied to demodulators. The service signal is extracted by the input or output of the fiber amplifier and is regenerated or demodulated and output as a binary service signal BSS.

In the event of an interruption in the optical waveguide 5, all high-energy light sources must be switched off, that is to say the lasers for the data signals and, in particular, the Raman pump laser 11. In contrast, the service signal OSS continues to be emitted with a low level in order to receive a criterion for switching on again when an optical waveguide 5 has been repaired. If the interrupted optical waveguide 5 has now been repaired and a connection has been restored between the transmitting device and the receiving device, a received signal which can be reliably evaluated cannot be received nevertheless since the Raman pump laser is still switched off and the Raman amplifier has thus not yet been activated. The lasers for the data signals are also still switched off and are activated only in response to a signal from a transmitting device assigned to the receiving device 6 using a second service signal which is transmitted in the opposite direction (not illustrated).

In the exemplary embodiment illustrated, a small part of the received signal is extracted using an extraction arrangement 8. The extracted signal OAS may be part of the overall signal WDM and OSS or, if a WDM demultiplexer is used as the extraction arrangement, may be only the service signal.

During undisrupted operation, the electrical service signal ESS is detected by the service signal detector 9 without any problems and the pump laser remains switched on. If the optical waveguide is now interrupted, the service signal detector will detect the absence of the service signal and will switch off the Raman pump laser using a laser switching-on/switching-off means 10, will inform the transmitting station of the counterpart station and will switch off its own transmitting lasers. This function may also be performed by the OSS regenerator 14.

If a connection has been interrupted, a service signal is also not received and the Raman amplifier remains deactivated. After the connection has been restored, the OSS detector 9 receives the service signal OSS with an extremely low level, in the case of a maximum design of the transmission path, since the Raman amplifier is still switched off. Detecting whether or not the service signal is present is now the problem to be solved. Reception of the service signal is rated as a criterion for an intact connection and is used to activate the Raman pump laser 11. The activated Raman amplifier considerably increases the amplification and causes the OSS regenerator to convert the service signal OSS into a binary electrical data signal BSS which is in turn evaluated, for example in order to switch on its own transmitting lasers and to transmit corresponding service information which in turn activates the lasers for the data signals S1 to Sn in the counterpart station 1 etc.

Figure 2:
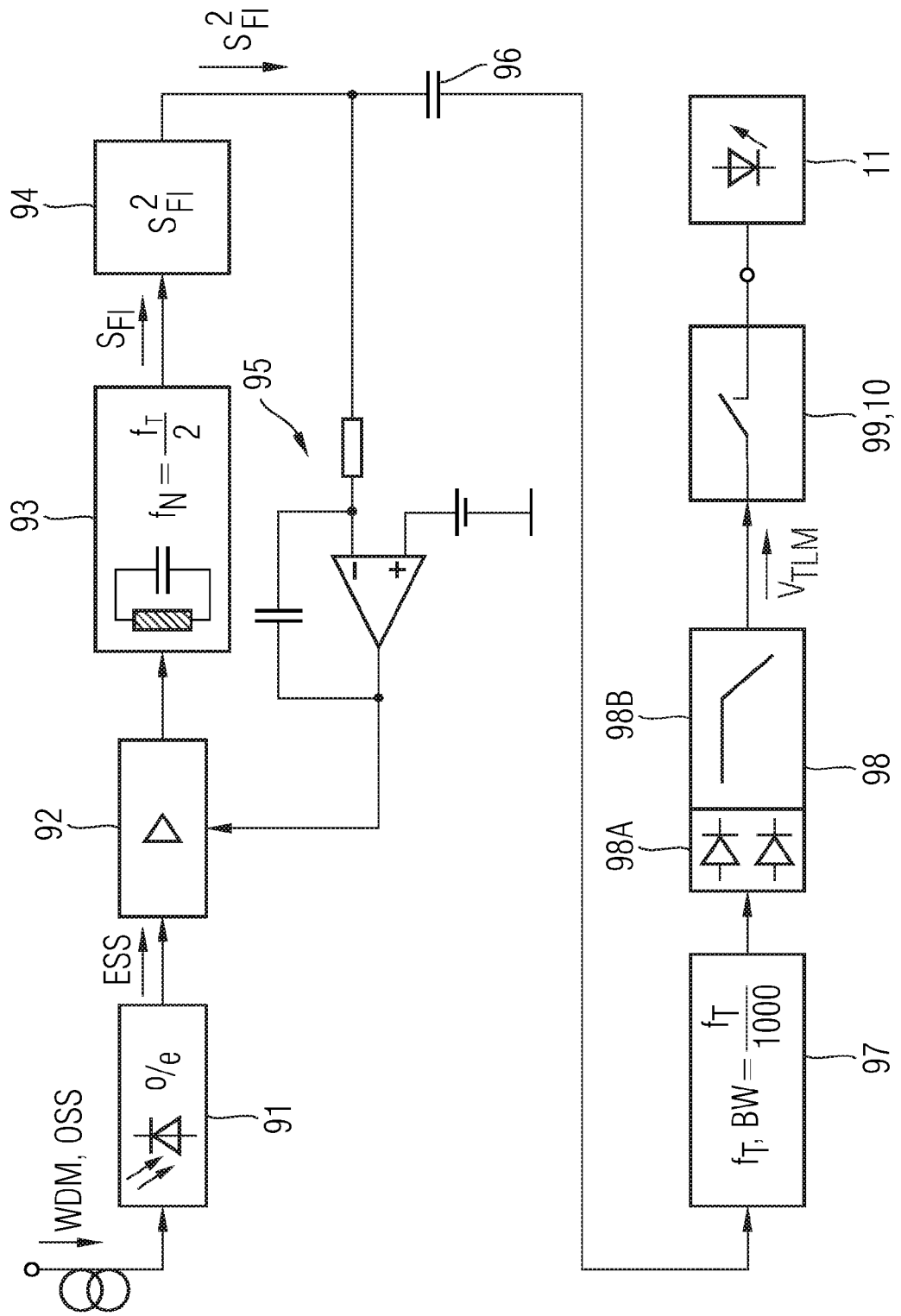
FIG. 2 shows a basic arrangement for detecting the service signal.

FIG. 2 illustrates the OSS detector in the form of block diagrams. The received optical service signal OSS is amplitude-modulated, for example. It is supplied to a demodulator/optoelectrical converter 91 (photodiode) which converts it into an electrical service signal ESS. The latter is first of all linearly amplified and is then supplied to a bandpass filter 93 with a low Q-factor. The output spectrum of said filter is supplied to a squaring element 94 and is converted by the latter in such a manner that all spectral lines which are symmetrical with respect to the Nyquist frequency are (partially) converted into a clock line TL with the clock frequency $f_T$ and the powers of said spectral lines are added there. The clock line TL generated in this manner is decoupled using a capacitance 96, is supplied to a narrowband receiver 97, is then rectified using an amplitude-measuring device 98 having a multipath rectifier 98A, is converted into a mean value in a low-pass filter 98B and is supplied, as the service signal voltage $V_{TLM}$, to a threshold value circuit 99, 10 which comprises the laser switching-on/switching-off means 10 and is activated when a service signal is received via the pump laser 11. The useful signals are sorted by means of filtering and do not need to be considered further.

The function of the OSS detector shall now be explained in more detail. FIG. 3 shows the envelope curve of spectral lines of the service signal OSS using the example of a $2^7-1$ NRZ pseudo random sequence. The spectrum has zero power P at the clock frequency $f_T$, and the Nyquist frequency $f_N$ is not represented either.

FIG. 4 shows a section from the area surrounding the Nyquist frequency, which section has been stretched in terms of frequency. The spectral lines have the same symmetrical separation both below and above the Nyquist frequency. As described below, this makes it possible to generate a large spectral component, the clock line TL at the clock frequency $f_T$. Following amplification, the envelope is first of all reshaped by the bandpass filter 93 which outputs a signal spectrum $S_{FI}$ whose envelope is approximately symmetrical with respect to the Nyquist frequency $f_N$ (half the clock frequency). A spectrum $S_{FI}$ as shown in FIG. 5a, which falls approximately symmetrically on both sides of the Nyquist frequency, is present at the output of said bandpass filter. This signal spectrum is supplied to the squaring element and squared. The spectrum $(S_{FI})^2$, in which the clock line TL occurs with a significant difference in level to the remaining other spectral components, is obtained at the output of the squaring element. The function of the squaring element is now considered in more detail. A pair of spectral lines (denoted α and β below) which is symmetrical with respect to the Nyquist frequency $f_N$ is singled out as representative of all spectral lines α1, α2, α3, . . . and β1, β2, . . . and is supplied to the squaring element. The multiplication produces the following:

$$(\sin \alpha + \sin \beta)^2 = \sin^2\alpha + 2 \sin \alpha \times \sin \beta + \sin^2 \beta \quad (1)$$

The middle term shall now be considered. The following is obtained from equation (1) by conversion:

$$2 \sin \alpha \times \sin \beta = [\cos(\alpha-\beta) - \cos(\alpha+\beta)] \quad (2)$$

where $$\alpha = \omega_N t + \Delta\omega t, \ \beta = \omega_N t - \Delta\omega t; \ \omega = 2\pi f \quad (3)$$

which, inserted into equation (2), results in the following:

$$\cos(\alpha - \beta) - \cos(\alpha + \beta) = \cos(\omega_N t + \Delta\omega t - \omega_N t + \Delta\omega t) - \quad (4)$$
$$\cos(\omega_N t + \Delta\omega t + \omega_N t - \Delta\omega t)$$
$$= \cos 2\Delta\omega t - \cos 2\omega_N t$$

The last term of the result, $\cos 2\omega_N t$, respectively results in the "clock line" (spectral line at the clock frequency $f_T$) for all pairs of spectral lines α, β whose powers are added, with the result that the clock line at $f_T$ stands out from the remaining spectral lines, which correspond to the remaining terms, with a high level. It should also be added that, as known, the noise is not correlated, with the result that the corresponding spectral components are not correlated with respect to the Nyquist frequency and therefore contribute to the interfering component only to a relatively slight extent. Only in this manner is it possible to detect the presence of a service signal despite a noise power of a multiple of the signal power. This consideration also allows an expedient bandwidth of the bandpass filter or the Q-factor of a resonant circuit which is used as the filter to be calculated. On the one hand, the intention is to perform correlation, with as wide a bandwidth as possible, between the spectral lines and, on the other hand, the intention is to reduce the noise bandwidth. In order to optimize the signal-to-noise ratio and the number of clock lines used with respect to the bandwidth, the Q-factor should be between approximately 0.75 and 2 for a (parallel) resonant circuit. A Q-factor of 1 is the optimum, for instance, and gives rise to a noise bandwidth of 0.75 $f_T$, for instance.

After squaring (the spectrum $(S_{FI})^2$ is illustrated in FIG. 5b), the clock spectral line is selected by filtering with as narrow a bandwidth as possible. The bandwidth can, in theory, be made virtually arbitrarily narrow and can thus reduce the noise signal with respect to the clock line. The narrowband filtering can be performed, for example, with the aid of a superheterodyne receiver, for example with a bandwidth BW=$f_T$/1000. It goes without saying that the frequency stability of the service signal carrier must also be taken into consideration. Rectification with subsequent filtering by the low-pass filter 98B produces, from the clock line, a DC voltage signal, for example a long-term mean value $ESS_M$, the amplitude of which controls the pump laser 11 via the threshold value circuit 99, 10. The threshold value circuit generally has hysteresis in order to avoid unnecessary switching during the transitions between reception/no reception of the service signal.

Figure 6:
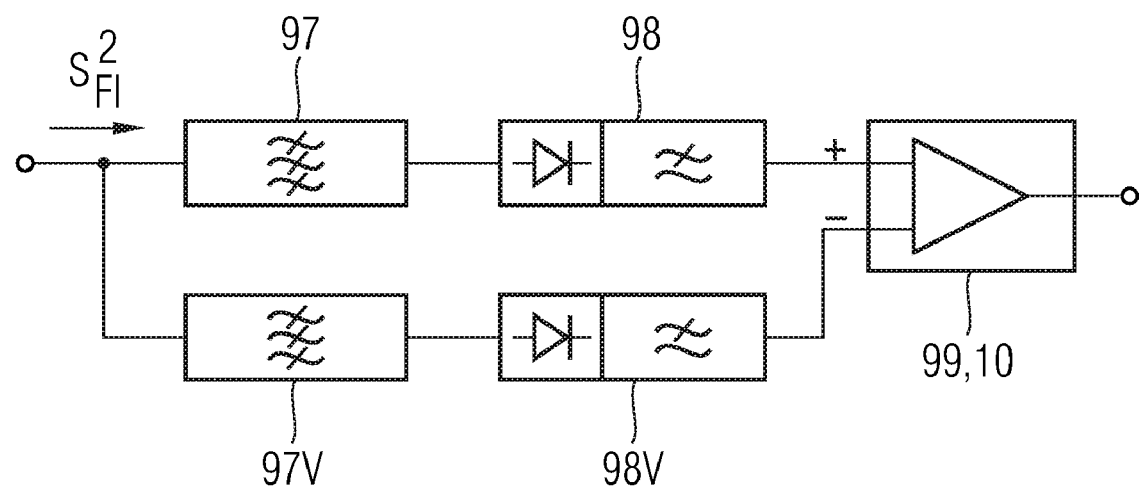
FIG. 6 shows a variant of the threshold value circuit.

A particularly suitable threshold value circuit is illustrated in FIG. 6, in which sensitivity and/or reliability is/are increased again. The two signal inputs of a differential amplifier, which is used as the threshold value circuit 99, 10, are supplied with, on the one hand, the mean value $V_{TLM}$ obtained from the clock line and, on the other hand, a comparison voltage VE which is selected from a comparison spectral range $S_{VE}$ (FIG. 5b) of the remaining spectrum by a (wider) bandpass filter 97V (or a wideband frequency-selective amplifier) and is obtained by means of a further amplitude-measuring device 98V having a rectifier and a low-pass filter. The circuit is dimensioned in such a manner that, when a service signal is present, the service signal voltage $V_{TLM}$ obtained from the clock line is considerably above the comparison voltage VE and, when there is no service signal, if practically only noise or reflections of the pump laser is/are received, the comparison voltage is considerably above the service signal voltage $V_{TLM}$.

The invention claimed is:

1. A method for switching a Raman pump laser on and/or off in an optical transmission system, comprising the steps of:
    combining, at a transmitting end, a service signal in a form of a NRZ-modulated binary data signal with an optical useful signal and then transmitting a combined optical signal;
    extracting, at the receiving end, an extracted optical signal of the combined optical signal;
    demodulating and converting the extracted optical signal into a converted electrical signal;
    filtering, out of a corresponding electrical signal spectrum by a bandpass filter, a symmetrical signal spectrum with respect to the Nyquist frequency of the service signal having a plurality of spectral lines which are symmetrical with respect to the Nyquist frequency the service signal;
    squaring the symmetrical signal spectrum;
    filtering a clock line at the clock frequency of the service signal from the squared signal spectrum; and
    evaluating the amplitude of the clock line to detect the service signal in order to switch the Raman pump on and/or off.

2. The method as claimed in claim 1, wherein the service signal is transmitted in a separate service channel having its own wavelength and extracted by wavelength demultiplexing from the combined optical signal, demodulated and converted, at the receiving end, into an extracted electrical signal in a form of an electrical service signal that is subjected to bandpass filtering.

3. The method as claimed in claim 2, wherein an electrical service signal is modulated onto the optical useful signals at the transmitting end and an extracted part of the combined signal is demodulated and converted at the receiving end into the extracted electrical signal which is subjected to bandpass filtering.

4. The method as claimed in claim 2, wherein the extracted electrical signal is linearly amplified at the receiving end.

5. The method as claimed in claim 1, wherein the clock line of the squared signal spectrum is subjected to narrow band selection at the receiving end.

6. An arrangement for switching a Raman pump laser on and/or off by detecting an optical service signal at a receiving end of an optical WDM transmission system, comprising:

an NRZ service signal generator arranged at the transmitting end generating said service signal in form of an NRZ-modulated binary data signal;

means for combining a useful signal and the optical service signal and transmitting a combined optical signal via a waveguide;

an extraction element at the receiving end, outputting an extracted optical signal of the combined optical signal;

a service signal detector receiving the extracted optical signal, wherein the service signal detector includes:
- a series circuit including a demodulator/optoelectrical converter outputting an extracted electrical signal, a linear amplifier, a bandpass filter filtering out of a corresponding electrical signal spectrum a symmetrical signal spectrum with respect to the Nyquist frequency, a squaring element squaring the symmetrical signal spectrum, a narrow band filter unit filtering a clock line at a clock frequency of the service signal, an amplitude-measuring device, and a threshold value circuit including a laser switching-on/switching-off device evaluating an amplitude of the clock line and to switch the Raman pump on and/or off.

7. The arrangement as claimed in claim 6, wherein:
a first coupling element is arranged as means for combining a useful signal and an optical service signal having another wavelength at the transmitting end; and
a wavelength demultiplexer is arranged as extracting element at the receiving end outputting the optical service signal as extracted optical signal.

8. The arrangement as claimed in claim 6, wherein
a modulator for modulating the service signal onto the useful signal is arranged as means for combining at the transmitting end; and
a splitter is arranged as extracting element at the receiving end outputting a portion of the combined optical signal as extracted optical signal.

9. The arrangement as claimed in claim 6, wherein a resonant circuit with a Q-factor of 0.75-2 is used as the bandpass filter.

10. The arrangement as claimed in claim 7, wherein a resonant circuit with a Q-factor of 0.75-2 is used as the bandpass filter.

11. The arrangement as claimed in claim 8, wherein a resonant circuit with a Q-factor of 0.75-2 is used as the bandpass filter.

12. The arrangement as claimed in claim 6, wherein the extraction element is inserted upstream of an optical amplifier.

* * * * *